UNITED STATES PATENT OFFICE.

JAMES E. SULLIVAN, OF CAMDEN, NEW JERSEY, ASSIGNOR TO N. Z. GRAVES COMPANY, OF PHILADELPHIA, PENNSYLVANIA, A CORPORATION OF PENNSYLVANIA.

METHOD OF MAKING LITHARGE.

No. 931,522.     Specification of Letters Patent.     Patented Aug. 17, 1909.

Application filed June 14, 1909. Serial No. 501,962.

*To all whom it may concern:*

Be it known that I, JAMES E. SULLIVAN, a citizen of the United States, residing at Camden, in the county of Camden and State of New Jersey, have invented certain new and useful Improvements in the Method of Making Litharge, of which the following is a specification.

My invention has relation to a method to utilize the by-product derived from manufacturing nitrite of soda for making monoxid of lead, generally known as litharge.

It is a well known fact that in reducing nitrite of soda mixed with metallic lead, assisted by heat, a by-product is derived, as oxid of lead. Hitherto this product has been employed in making red lead, requiring about sixty hours' time to complete such product. I have found that such a by-product can be utilized in very much less time, economically and efficiently, in the making of a fine character as well as quality of litharge and mechanically the litharge is expeditiously then brought into a powdered condition, for commercial use.

A preferred manner of carrying out my invention consists in taking said by-product derived from the manufacture of nitrite of soda, monoxid of lead Pb O. after the following equation $Na.NO_3 + Pb = NaNO_2$ and $PbO$. and separating under any of several known processes, the monoxid of lead, by washing to free soluble impurities therefrom and then in due course conveyed to a drying furnace, wherein it is subjected to direct fire heat ranging from 900° to 1200° Fah. for a period of three hours, more or less, whence the mass is then removed, quickly cooled and then ground. After thorough bolting the litharge derived in a uniformly powdered condition, is ready for the market, the production of the litharge not consuming over ten hours, in the production thereof. The important feature of my present invention is the discovery that said by-product obtained from manufacturing nitrate of soda, if taken and treated as hereinbefore explained, in three hours, more or less, barring the time of mechanical operations upon the same, gives a most excellent litharge, in a uniformly powdered condition, for commercial uses.

Having thus described the nature and object of my invention, what I claim as new and desire to secure by Letters Patent is:—

1. The herein described method of making litharge, which consists in subjecting monoxid of lead, the by-product of the making of nitrite of soda, to a temperature ranging between 900° and 1200° Fah. during a period of but a few hours, and then mechanically reducing the derived litharge.

2. The herein described method of making litharge, which consists in subjecting monoxid of lead to a temperature ranging between 900° and 1200° Fah. during a period of three hours, more or less, and then mechanically reducing the derived litharge to a uniformly powdered commercial condition.

In witness whereof, I have hereunto set my signature in the presence of two subscribing witnesses:

JAMES E. SULLIVAN.

Witnesses:
   N. Z. GRAVES, Jr.,
   P. L. PERKINS.